US012276140B2

(12) United States Patent
Bendel

(10) Patent No.: US 12,276,140 B2
(45) Date of Patent: Apr. 15, 2025

(54) LOCK WITH ASSISTED CLOSING DEVICE FOR A MOTOR VEHICLE

(71) Applicant: Kiekert AG, Heiligenhaus (DE)

(72) Inventor: Thorsten Bendel, Oberhausen (DE)

(73) Assignee: Kiekert AG, Heiligenhaus (DE)

( * ) Notice: Subject to any disclaimer, the term of this patent is extended or adjusted under 35 U.S.C. 154(b) by 687 days.

(21) Appl. No.: 16/481,876

(22) PCT Filed: Jan. 30, 2018

(86) PCT No.: PCT/DE2018/100070
§ 371 (c)(1),
(2) Date: Jul. 30, 2019

(87) PCT Pub. No.: WO2018/137738
PCT Pub. Date: Aug. 2, 2018

(65) Prior Publication Data

US 2020/0040618 A1 Feb. 6, 2020

(30) Foreign Application Priority Data

Jan. 30, 2017 (DE) ..................... 10 2017 101 703.8
Jan. 30, 2017 (DE) ..................... 10 2017 101 704.6

(51) Int. Cl.
*E05B 81/20* (2014.01)
*E05B 81/30* (2014.01)
(Continued)

(52) U.S. Cl.
CPC .............. *E05B 81/21* (2013.01); *E05B 81/30* (2013.01); *E05B 81/32* (2013.01); *E05B 81/66* (2013.01)

(58) Field of Classification Search
CPC .......... E05B 81/06; E05B 81/18; E05B 81/20; E05B 81/24; E05B 81/25; E05B 81/26;
(Continued)

(56) References Cited

U.S. PATENT DOCUMENTS

| | | | | |
|---|---|---|---|---|
| 5,632,120 A | 5/1997 | Shigematsu | | |
| 7,380,844 B2 * | 6/2008 | Berghahn | E05B 81/20 | 292/216 |

(Continued)

FOREIGN PATENT DOCUMENTS

| | | |
|---|---|---|
| CA | 1858387 A | 11/2006 |
| CN | 105026670 A | 11/2015 |

(Continued)

OTHER PUBLICATIONS

International Search Report and Written Opinion for corresponding Patent Application No. PCT/DE2018/100070 dated May 23, 2018.

(Continued)

*Primary Examiner* — Kristina R Fulton
*Assistant Examiner* — Noah Horowitz
(74) *Attorney, Agent, or Firm* — Renner, Otto, Boisselle & Sklar, LLP

(57) ABSTRACT

A lock for a motor vehicle, comprising a locking mechanism composed of a rotary latch and at least one pawl, an assisted closing device, an electric drive, and a torque converter, wherein a variable torque is adjustable in the assisted closing device by means of the torque converter, and wherein the assisted closing is achieved at least in some regions by means of a frictional connection.

20 Claims, 2 Drawing Sheets

(51) Int. Cl.
*E05B 81/32* (2014.01)
*E05B 81/66* (2014.01)

(58) Field of Classification Search
CPC .......... E05B 81/28; E05B 81/30; E05B 81/48; E05B 85/26; Y10T 292/1047; Y10T 292/1082; Y10S 292/23; Y10S 292/42; Y10S 292/43
See application file for complete search history.

(56) References Cited

U.S. PATENT DOCUMENTS

| | | | | |
|---|---|---|---|---|
| 7,766,397 | B2 * | 8/2010 | Carabalona | E05B 81/20 292/201 |
| 10,584,520 | B2 * | 3/2020 | Scholz | E05B 81/16 |
| 2005/0134054 | A1 * | 6/2005 | Stefanic | E05B 17/0004 292/201 |
| 2006/0261601 | A1 * | 11/2006 | Shimizu | E05B 81/14 292/216 |
| 2006/0267351 | A1 * | 11/2006 | Spurr | E05B 81/20 292/216 |
| 2009/0019773 | A1 * | 1/2009 | Gruhn | E05F 15/646 49/28 |
| 2009/0151257 | A1 * | 6/2009 | Dominique | E05B 81/20 292/2 |
| 2010/0244466 | A1 * | 9/2010 | Tomaszewski | E05B 77/26 292/201 |
| 2016/0003331 | A1 * | 1/2016 | Topfer | E05C 21/00 74/516 |
| 2016/0186468 | A1 * | 6/2016 | Ilea | E05B 81/20 292/201 |
| 2020/0115933 | A1 * | 4/2020 | Ney | E05B 81/06 |

FOREIGN PATENT DOCUMENTS

| | | | | |
|---|---|---|---|---|
| CN | 105940173 | A | 9/2016 | |
| DE | 19714992 | A1 | 9/1998 | |
| DE | 19828040 | B4 | 12/1999 | |
| DE | 19913666 | A1 * | 9/2000 | E05B 77/42 |
| DE | 10140365 | A1 | 3/2003 | |
| DE | 10140385 | A1 | 3/2003 | |
| DE | 10155307 | A1 * | 5/2003 | E05B 81/20 |
| DE | 102004011798 | B3 * | 10/2005 | E05B 81/20 |
| DE | 202008015788 | U1 | 7/2009 | |
| DE | 202008015789 | U1 * | 5/2010 | E05B 81/20 |
| DE | 102013106672 | A1 | 9/2014 | |
| DE | 102013022059 | A1 | 6/2015 | |
| DE | 102015005963 | A1 * | 2/2016 | B60K 28/12 |
| EP | 1319780 | A1 | 6/2003 | |
| EP | 2071106 | A1 | 6/2009 | |
| JP | S57169184 | A | 10/1982 | |
| JP | H0949356 | A | 8/1995 | |
| JP | 2011106138 | A | 6/2011 | |
| JP | 2016510844 | A | 4/2016 | |
| WO | WO-2007090389 | A1 * | 8/2007 | E05B 81/21 |
| WO | 2015/139678 | A1 | 9/2015 | |

OTHER PUBLICATIONS

Translation of OA1 Issued Jun. 24, 2020 for Related Chinese National Phase Application No. 201880008948.8.

* cited by examiner

LOCK WITH ASSISTED CLOSING DEVICE FOR A MOTOR VEHICLE

The object of the invention is a lock for a motor vehicle, comprising a locking mechanism composed of a rotary latch and at least one pawl, an assisted closing device, an electric drive, and a torque converter, wherein a variable torque is adjustable in the assisted closing device by means of the torque converter.

In order to increase the level of comfort in a motor vehicle and facilitate the simple operation of a motor vehicle, more and more comfort functions are being integrated into the motor vehicle. It is therefore known, for example, that motor vehicle doors, flaps or hoods are closed by means of an assisted closing device. The reason for this may on the one hand be that this enables the door to be closed easily, or on the other hand that for example there is no longer the need for an external door handle in order to achieve a corresponding design or to simplify the operation in that the door can close by itself. These assisted closing devices are widely used with fully automatic tailgates in particular. These flaps can for example be actuated with a remote control without manual actuation of the flap.

DE 101 40 365 A1 therefore for example concerns a cinching striker for a motor vehicle door latch, whereby the term "cinching striker" is used for a striker where automatic assisted closing occurs. A locking bolt of the motor vehicle door latch is hereby affixed to an adjustable actuation swinger. In addition to this, a drive is provided for the actuation swingers. The drive transfers the actuation swingers with the locking bolt and a rotary latch encompassing the locking bolt and thus an associated door, by motor from a pre-latching position to a main latching position. An additional lock lever ensures that the actuation lever is kept in this position when the door is transferred manually from the pre-latching position to the main latching position.

Strikers like these that are equipped with an assisted closing device are essentially used for all conceivable doors on a motor vehicle. Application is therefore not only conceivable for side doors, but also for trunk flaps, tailgates or hoods and is included within the framework of the invention. With the help of such an assisted closing device, the door or vehicle door in question can now be relocated from the aforementioned pre-latching position to a main latching position against the resistance of for example a seal.

A further constructive design of an assisted closing device is the object of DE 198 28 040 B4. This is a power assisted locking device for doors, flaps, tops or roofs of motor vehicles and in particular passenger cars where a pivotable stop element is affixed to a rotary latch. In addition to this, the pawl interacting with the rotary latch also has a pivotable stop element. Both stop elements work together with a control disc during the opening or closing process. The control disc is part of an actuating drive that is used to bring about both an opening and closing process.

In DE 20 2008 015 089 U1, the procedure is such that a transition lever located coaxially to an axis of a rotary latch of the locking mechanism is provided. In addition to this, a drive pawl is located on a transmission element. The drive pawl is connected to the drive by means of a Bowden cable or a different connector.

In the class-specific state of the art, a pull-handle or drive pawl is used and with the aid of a Bowden cable with a separate external drive, a rotary latch is transferred from a pre-latching position to a main latching position. The assisted closing device hereby has a Bowden cable that is connected to a torque converter via a cam disk. An electric drive therefore for example seizes a gear by means of a worm gear, whereby the gear also has a cam disk. The Bowden cable is hereby connected in such a way to the cam disk that a torque that is dependent on the drive path, can be generated.

A progressively increasing torque is preferably achieved here so that a different assisted closing torque can be available on the rotary latch, that is dependent on the position of the cam disk. The torque converter thus creates a force that is dependent on the drive path, the assisted closing force needed for assisted closing, in other words, transferring the rotary latch from a pre-latching position to a main latching position. This is for example advantageous since when transferring the rotary latch from the pre-latching position to the main latching position, the rotary latch must be moved against a sealing pressure out of for example a door seal.

The known assisted closing devices for motor vehicle door latches have essentially proven themselves, but in practice often reach limits or require improvement. This can essentially be attributed to the fact that the force provided by the drive may well be sufficient and can also be variably adapted to the required force in accordance with the class-specific state of the art, but that further measures are required in order to be able to provide a comfort function when it comes to greater assisted closing paths. In other words, solutions are not available for all comfort functions when it comes to the assisted closing of a motor vehicle, that also fulfill all safety-related features when automatically closing motor vehicles.

The object of the invention is to provide an improved lock for a motor vehicle. Furthermore, the object of the invention is to provide an assisted closing device for a lock that can also be used to obtain greater assisted closing paths for a motor vehicle door for example, without impairing the safety of the operator of a motor vehicle. Another object of the invention is to provide a constructively favorable and cost-saving solution.

The object is solved by the characteristics of the independent patent claim 1. Advantageous designs of the invention are specified in the sub-claims. It should be noted that the exemplary embodiments described hereafter are not restrictive, and there is the possibility of variations in the characteristics described in the description and sub-claims.

According to patent claim 1, the object of the invention is solved by providing a motor vehicle lock, comprising a locking mechanism composed of a rotary latch and at least one pawl, an assisted closing device, an electric drive and a torque converter, wherein a variable torque is adjustable in the assisted closing device by means of the torque converter and wherein the assisted closing is achieved at least in some regions by means of a frictional connection. As a result of the force that is transmitted at least in some regions during assisted closing in the form of a frictional connection, there is now the possibility that greater assisted closing paths too can be automatically realized for a motor vehicle or a mobile component affixed to the motor vehicle, without incurring a safety risk to the operator. A safety risk arises if a mobile component affixed to the motor vehicle is moved by means of an electric drive, which in turn can lead to an operator being trapped.

With flaps or doors in particular, very high assisted closing forces are needed for a door or flap to close against the pressure of a seal. If the door or flap or any other mobile component is pulled shut in such a way that there is only one frictional connection in the assisted closing device, then the component on the motor vehicle can be moved, but if for example a person or an object is trapped by the mobile part, then the frictional connection can be overridden and the assisted closing process can be interrupted. For this, a force emerging from the frictional connection simply has to be generated during trapping in order to interrupt the assisted closing process or to disengage part of the assisted closing device. The frictional connection hereby enables the safety risk of trapping to be eliminated.

Various locks and actuation elements can be used as locks for a motor vehicle. The lock can be used as a compact constructional unit, for example, in a side door, sliding door or in the vicinity of flaps, lids or covers. Furthermore, it is also conceivable, for example, that hood latches, auxiliary locks, such as those used in transporters, may be used.

A locking mechanism in a motor vehicle lock has a rotary latch and at least one pawl, whereby the rotary latch can be held in a locked position using the pawl. Two-stage locking mechanisms consisting of a pre-ratchet and a main ratchet are used, as are systems with one or two pawls.

A release lever acts on the locking mechanism, whereby the release lever disengages one or more pawls from the catch, for example, by a swivel movement. The release lever is pivotably accommodated in the motor vehicle lock and preferably in a housing and/or a frame box of the motor vehicle lock.

The assisted closing device has an electromotorized drive and works together with a torque converter. The electric drive and the torque converter can hereby be located directly in the lock or can interact as a separate module, for example by means of a Bowden cable, either indirectly or directly with the rotary latch. This means for example that an electromotorized drive with the respective transmission as torque converter is designed as a separate module and that the separate module is connected with a latch housing of the lock, for example by means of a Bowden cable. The Bowden cable core can then for example be connected to a pull-handle, whereby the pull-handle can directly affect the rotary latch. The pull-handle is pivotably accommodated in the lock, namely such that the pull-handle can engage with the rotary latch via the assisted closing path.

However, it is also conceivable that the assisted closing device is integrated directly on the lock or even in the lock. It is hereby conceivable for example that the electric drive and torque converter, for example in the form of a transmission, are directly connected to the rotary latch. An electric motor can then for example interact with a spindle drive, whereby the spindle drive moves the pull-handle. The pull-handle can in this instance be pivotably accommodated in the lock, such that the pull-handle can engage with the rotary latch via the assisted closing path.

A transmission or mechanism can therefore for example act as torque converter, with which at least different forces or torques can be introduced into the rotary latch. The torque converter enables at least in some regions, in other words, a variable torque is obtainable via the assisted closing path, so that the rotary latch can be acted upon with different forces or torques.

The assisted closing is realized at least in some regions by means of a frictional connection. This means that during the electromotorized assisted closing, at least via part of the assisted closing movement and preferably via a first part, the assisted closing mechanism is designed such that a detachable connection can be established between for example a pull-handle and the rotary latch. In other words, a connection can be established between the pull-handle and rotary latch, that is preventable. The frictional connection during the assisted closing of the rotary latch can hereby for example be overridden if an operator of the motor vehicle grips a door or flap manually, thus overriding the frictional connection, which interrupts the assisted closing.

In one embodiment of the invention, there is then the advantage if, during a first assisted closing movement of the rotary latch, the assisted closing device introduces an assisted closing torque into the rotary latch by means of a frictional connection and if during a second assisted closing movement of the rotary latch, the assisted closing device introduces an assisted closing torque into the rotary latch by means of a form fit. The combination from the first assisted closing movement by means of a frictional connection and a second assisted closing movement by means of a form fit can enable the safe assisted closing to also be achieved across greater distances or assisted closing movements. Assisted closing hereby occurs in the first region of the assisted closing movement by means of a frictional connection and can for example be stopped by the operator or a medium, that prevents the door or flap from being closed. A coat or hand can therefore for example be near the door or flap and this prevention medium then prevents any further assisted closing, in that the frictional connection is overridden and the assisted closing process can be interrupted. Only if in a second region of the assisted closing movement, a form fit has occurred between the rotary latch and the assisted closing device, then the assisted closing movement can no longer be interrupted. Easily interruptable assisted closing is hereby facilitated in the first region, whereas in the second region, assisted closing is or can be facilitated by means of the form fit against the force of for example a door or flap seal.

If the rotary latch has a main latching position, in particular a pre-latching position and a main latching position, whereby the pull-handle can engage with the rotary latch independently of the latching position, then this is a further advantageous embodiment of the invention. Advantageously, the pull-handle can also already engage with the rotary latch if no latching position of the rotary latch has been reached. In this case, the door, flap or sliding door would for example be merely ajar, but not yet engaged with the locking mechanism of the lock. The possibility therefore exists of moving the rotary latch across a large region, thus also closing the door or flap across a large assisted closing region by means of the assisted closing device.

The assisted closing device can have a pull-handle, whereby the pull-handle can be moved to engage with the rotary latch. In addition to this, the assisted closing device can have a Bowden cable and/or a transmission. In both cases, there are advantageous embodiments of the invention, whereby the pull-handle offers a constructively simple option to establish on the one hand a frictional connection and on the other hand a form fit between the pull-handle and rotary latch. In addition to this, it is also conceivable that the frictional connection can be established through a connection between the electromotorized drive and transmission and a Bowden cable. In other words, the connection between the Bowden cable or Bowden cable core and the transmission can be designed such that there is a frictional connection via a first assisted closing region, in other words, a first assisted closing movement, whereas via a second assisted closing region or the second part of the assisted closing movement, a form fit can be created between the transmission and the Bowden cable core.

The frictional connection in the assisted closing device can hereby be created by means of the Bowden cable and/or by means of the transmission and/or by means of the pull-handle. Achieving the frictional connection in the assisted closing device is therefore not bound to the combination of media, but can also be achieved through the combination of the existing parts in the assisted closing device or in the lock. The transmission can for example contain a sliding clutch, the Bowden cable can be driven via a semi-engaged connection and the pull-handle can for example be shaped such that via a first assisted closing path there is only a frictionally engaged connection between the pull-handle and rotary latch. The combination of frictional connection and form fit then enable on the one hand a frictional connection and on the other hand a form fit to be created in the assisted closing device.

In one embodiment of the invention, the assisted closing torque in the first assisted closing movement is less than the assisted closing torque in the second assisted closing movement. The distribution of the forces in the assisted closing movement and an adaptation of the transmitted forces or torques in the different movements of the assisted closing device hereby allow assisted closing to also be prevented with little force. When it comes to the frictional connection in particular, in other words, in the first assisted closing movement, a very low torque can then be used to close the door, the result of which is that even with very little force, an operator of the motor vehicle, including also a child, can for example be capable of preventing or stopping the assisted closing movement in the first part of the assisted closing. If during the first part of the assisted closing movement, the assisted closing movement is interrupted, then the assisted closing device is disengaged, the frictional connection is overridden and the door and/or flap can be opened.

In one embodiment of the invention, an assisted closing force of approx. 100 Newtons can be generated in the first assisted closing movement by means of the assisted closing device and an assisted closing force of approx. 500 Newtons in a second assisted closing movement, or it can be provided by means of the assisted closing device. A low force for assisted closing during the force-fitting transmission of the force in the assisted closing device allows the assisted closing process to also be interrupted slightly through for example a child's hand. Trapping during the assisted closing and in particular during the first part of the assisted closing movement can hereby be assured. The very low forces of 80 to approximately 120 Newtons hereby enable a door or flap to be moved, with interruption of the assisted closing movement being easily possible. Only in the second part of the assisted closing movement does the pull use a higher force of approx. 500 Newtons or a torque is introduced into the rotary latch so that for the force for example of a door or flap seal, the safe assisted closing of the door and the transfer to a main latching position is also possible.

Advantageously, an assisted closing movement of the rotary latch can be introduced when the rotary latch engages in a striker, which is a further embodiment of the invention. Irrespective of the relevant latching position, the assisted closing device and rotary latch are used to create the closing process. If the rotary latch with the striker, striker bolt or a latch bracket hereby achieve an operative connection, then the rotary latch can introduce or initiate an assisted closing movement of the door or flap. If at this point in time the rotary latch is already driven by an electric motor or indirectly by means of the assisted closing device, then a closing movement can be driven by an electric motor, in other words, automatically across a very wide closing region of the door. The closing movement is hereby not dependent on a latching position being reached, in other words, a pre-latching position or a main latching position of the locking mechanism, but can already be initiated by means of the rotary latch when the striker is reached.

If the first assisted closing movement can be realized from reaching the engagement of the rotary latch in a striker to a closing position of 4 mm. Assisted closing from the engagement of the rotary latch in the striker to a position in which the door or flap is already closed up to 4 mm, offers a maximum level of safety. During the first assisted closing movement there is only a frictional connection, so that the closing movement can be interrupted up to a closing region of 4 mm. Only at a closing position of 4 mm does the form fit then engage in the second assisted closing movement. 4 mm represent a gap at the door or flap which prevents an engagement for example by means of a hand or finger. At a closing position of 4 mm, the interlocking assisted closing action can hereby take place, whereby a maximum level of safety can be achieved for the operator of the motor vehicle. The gap in relation to the rotary latch reaching the engagement region of the striker can however be variable and differs depending on the design of the motor vehicle. It is however conceivable that the engagement of the rotary latch engages for a gap of 25 mm, preferably 20 mm and even better 15 mm, with the most preferable being a gap of 10 mm. The first assisted closing movement can therefore perform the assisted closing of gaps of more or less than 20 mm by means of a force-fitted movement, without incurring a safety risk to the operator. The formation of the assisted closing device according to the invention hereby also provides a constructively favorable and cost-saving solution for assisted closing, since in most cases the same components can be used, whereby in part and depending on the embodiment, only constructive changes need to be made to existing components.

According to patent claim 11, the object of the invention is solved by providing a lock for a motor vehicle, comprising a locking mechanism composed of a rotary latch and at least one pawl, an assisted closing device with an electric drive and a sensor for recording a position of the locking mechanism and a control unit for the assisted closing device, whereby at least one medium for recording a position of a medium of the mobile part of the assisted closing device is provided and the recording medium interacts with the control unit. As a result of the interaction in accordance with the invention between the medium for recording a position of the component to be moved in combination with the assisted closing device, the control unit is able to record with accuracy the position of the component. This particularly means that it is possible that the movement that has been introduced into the component by means of the assisted closing device, can be interrupted at any time. The control unit is hereby in a position, irrespective of the position of the component during the engagement with the assisted closing device, to interrupt the assisted closing process. The assisted closing process can be interrupted, by interrupting a current from the assisted closing device, by for example disengaging a pull-handle that is engaged and/or is interrupted by reversing the assisted closing process. This can for example prevent the trapping of an operator.

With flaps or doors in particular, very high assisted closing forces are needed since the assisted closing forces must close a door or flap against the pressure of a seal. If the door or flap or a different mobile component is closed with assistance such that during the assisted closing, the component with the applied assisted closing torque is monitored, then the assisted closing process can be interrupted.

Various locks and actuation elements can be used as locks for a motor vehicle. The lock can be used as a compact constructional unit, for example, in a side door, sliding door or in the vicinity of flaps, lids or covers. Furthermore, it is also conceivable, for example, that hood latches, auxiliary locks, such as those used in transporters, may be used.

A locking mechanism in a motor vehicle lock has a rotary latch and at least one pawl, whereby the rotary latch can be held in a locked position by means of the pawl. Two-stage locking mechanisms consisting of a pre-ratchet and a main ratchet are used, as are systems with one or two pawls.

A release lever acts on the locking mechanism, whereby the release lever disengages one or more pawls from the catch, for example, by a swivel movement. The release lever is pivotably accommodated in the motor vehicle lock and preferably in a housing and/or a frame box of the motor vehicle lock.

The assisted closing device has an electromotorized drive and works together with a torque converter. The electric drive and the torque converter can hereby be located directly in the lock or can interact as a separate module, for example by means of a Bowden cable, indirectly or directly with the rotary latch. This means for example that an electromotorized drive with the respective transmission as torque converter is designed as a separate module and that the separate module is connected with a latch housing of the lock, for example by means of a Bowden cable. The Bowden cable core can then for example be connected to a pull-handle, whereby the pull-handle can directly affect the rotary latch. The pull-handle is pivotably accommodated in the lock, namely such that the pull-handle can engage with the rotary latch via the assisted closing path.

However, it is also conceivable that the assisted closing device is integrated directly on the lock or even in the lock. It is hereby conceivable for example that the electric drive and torque converter, for example in the form of a transmission, are directly connected to the rotary latch. An electric motor can then for example interact with a spindle drive, whereby the spindle drive moves the pull-handle. The pull-handle can in this instance be pivotably accommodated in the lock, such that the pull-handle can engage with the rotary latch via the assisted closing path.

A transmission or mechanism can therefore for example act as torque converter, with which at least different forces or torques can be introduced into the rotary latch. The torque converter enables at least in some regions, in other words, a variable torque is obtainable via the assisted closing path, so that the rotary latch can be acted upon with different forces or torques.

Assisted closing takes place with the constant recording of the movement of the component, whereby the recording medium of the control unit transmits a signal so that at any point during the assisted closing, the position of the component or the position of the component medium of the part of the motor vehicle being closed, can be determined. If, as described above, the assisted closing device is a locking mechanism of a motor vehicle that is used for the assisted closing of a side door of a motor vehicle, then the recording medium can be used to determine the position of the door and thus also the gap during the assisted closing. The gap here is determined as the distance between the moving door and the chassis. The gap here in particular determines the region that is open for example for a hand of the operator between the mobile component, preferably the door, and the chassis, when the door is being closed.

In one embodiment of the invention, there is then the advantage if the recording medium is a sensor or a switching device, in particular a microswitch. A recording medium can for example be a rotary sensor that records the rotational movement of the component being moved, in particular the rotary latch. In addition to this, one, two or more microswitches can also be used that record the movement separately and/or in combination, thereby making it possible to determine the movement of the component and thus also for example the door or flap that is being moved by means of the component. The movement of the door or flap can hereby also be recorded separately so that together with the control unit, the positions can be determined. Microswitches are cost-effective, whereas rotary sensors enable a very accurate determination of a component being moved and its position.

It can thus be advantageous if the monitoring of the assisted closing process is only regional, particularly if only regions of the gap have to be able to be monitored. In fact, the pull-handle only actually engages within a region of <10 mm, preferably <8 mm and even better <6 mm into the component to be moved. At this point, the monitoring of the assisted closing process must consequently take place first. Beyond a gap of <4 mm, an operator can no longer for example place his fingers in the gap between for example the door and chassis. The region <4 mm can then for example be excluded from the monitoring process. Monitoring of a gap of 10-4 mm, preferably 8-4 mm and even better still 6-4 mm, is regarded as an advantageous embodiment.

If the medium for recording a position interacts with the control unit in such a way that by recording a rise in current in the electric drive, the assisted closing process can be interrupted. A rise in current in particular is an indication that the assisted closing process is subjected to a high load. If this rise in current is evaluated by means of the control unit, then the control unit can determine whether the deviation of the rise in current is such that the rise in current is outside a tolerance range, so that the assisted closing process can be interrupted. If the assisted closing drive for example affects a locking mechanism of a lock in a side door of a motor vehicle, then the door ends up for example in a main ratchet of the locking mechanism of the side door lock. The assisted closing process now starts, in other words, a pull-handle for example engages with the rotary latch and moves the rotary latch such that the rotary latch can be transferred from a pre-latching position to a main latching position. During this process, the assisted closing device must move the door against the door seal so that as the closing position increases and the gap reduces, greater force must be applied for the assisted closing. The force however can be determined within a tolerance range so that deviations outside the tolerance range or a definable tolerance range can be detected and the control unit is able to interrupt the assisted closing process, eject the pull-handle if necessary and/or initiate the reversal of the assisted closing process. The rise in current can hereby be used in an advantageous way as a safety measure during the assisted closing.

In a further embodiment of the invention, the mobile component is a door, a flap, a cover or a hood of a motor vehicle. The mobile component is moved by means of the assisted closing device, whereby the component nestles against the motor vehicle or chassis such that there is no gap or only a very small gap. On the one hand, to achieve the most optimum aerodynamics of the motor vehicle and on the other hand for aesthetic reasons, the gaps are kept to a minimum or for example in the case of a convertible top, to assure secure locking. When locking and in particular for automatic locking, there is always the danger of an operator or a foreign object being jammed. The option of recording the rise in current for the purpose of the invention during the automatic assisted closing then offers the advantage that an electronic control signal can be created to interrupt the assisted closing process.

If the assisted closing device interacts directly with the locking mechanism or a retaining band, then this is a further advantageous embodiment of the invention. Assisted closing occurs depending on the application point of the assisted closing device such that the components, such as flaps, covers or doors, are transferred from a first closing position to a second closing position. If for example a locking mechanism of a motor vehicle lock executes assisted closing then the door or flap can be transferred from a pre-latching position of the locking mechanism to a main latching position. If the assisted closing device engages on the retaining band, there is also the option to move or pull shut the door or flap across another region. During the assisted closing, it is continuously being monitored whether the assisted closing and in particular the power consumption of the drive is within the tolerance range or tolerance window of the power consumption in order to hereby determine if there is a possible risk to an operator.

If the rotary latch can be moved by means of the assisted closing device, then this is a further advantageous embodiment of the invention. The movement of the rotary latch can hereby be such that for example a pull-handle engages with a force-fitting and/or form-fitting with the rotary latch. If the rotary latch is moved by means of the assisted closing device and for example by means of a pull-handle, then the rotary latch that has engaged with the striker can move the door or flap or bench from a first engagement position in the striker into the main latching position or an overstroke position. If during the assisted closing, an excessive power consumption is detected on the drive, then the assisted closing process can be interrupted. As a result of the formation according to the invention, a maximum level of safety can hereby be assured. Jamming or injury during the assisted closing can hereby be prevented.

In one embodiment, the medium for recording the position is located on the rotary latch. Advantageously, the sensor medium can engage the rotary latch directly so that the assisted closing range that is vital to an operator of the motor vehicle, is monitored very accurately. The assisted closing region that can lead to an injury or jamming, is of particular interest here. By scanning the position of the rotary latch, it is possible to very accurately monitor the gap or determine the gap, since the gap of the door can accurately relate to the engagement ratios between the rotary latch and striker.

A further embodiment then arises if a variable assisted closing torque can be provided by means of the assisted closing device. Independent of the monitoring of the assisted closing movement, a variable assisted closing torque can be actuated by the control unit, whereby a tolerance window is monitored at any point so that the current cannot deviate beyond the tolerance window, without the control unit at least issuing a warning signal or interrupting the assisted closing process, uncoupling the assisted closing or reversing the assisted closing process. In any way, the jamming of an operator can hereby be prevented and there is no risk of the operator being injured.

The invention is described in further detail below with reference to the attached drawings on the basis of an exemplary embodiment. However, the principle applies that the exemplary embodiment does not limit the invention, but only constitutes an advantageous embodiment. The characteristics depicted can be executed individually or in combination with further characteristics of the description, as can the patent claims be executed individually or in combination.

Depicted are:

Figure 1:
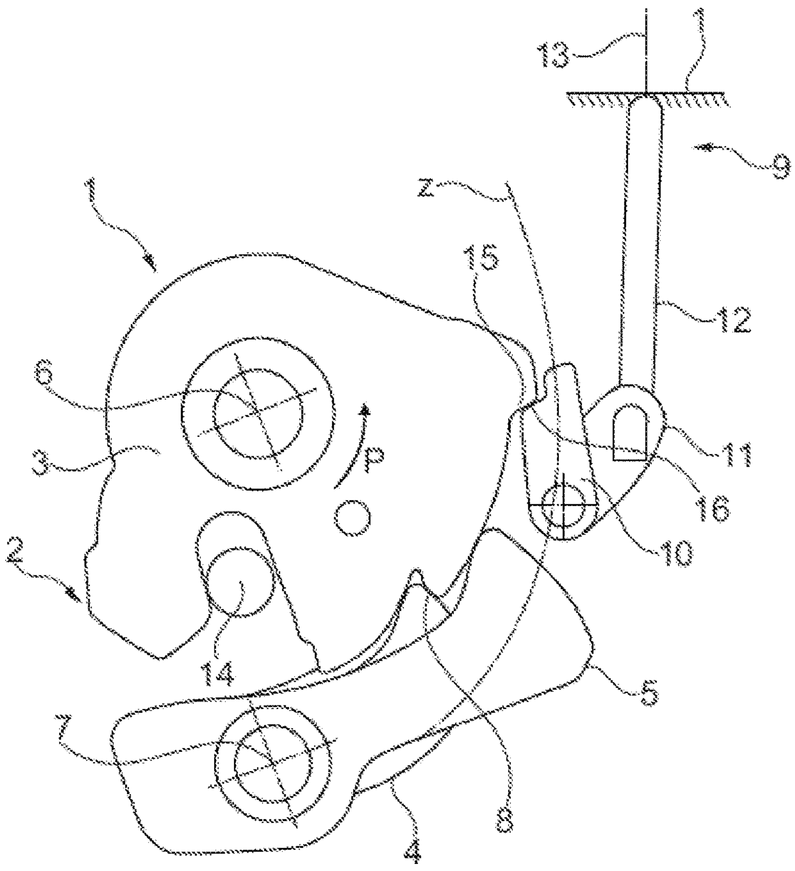
FIG. 1 is a drawing depicting an illustration of a part of an assisted closing device in a motor vehicle lock with a locking mechanism with a pre-ratchet and main ratchet.

FIG. 1 shows a part of a motor vehicle lock 1. It shows a locking mechanism 2 from a rotary latch 3, a pre-latching pawl 4 and a main latching pawl 5. The rotary latch 3 is pivotably accommodated around an axis 6 and pawls 4, 5 around an axis 7. In order to obtain a closing position, the rotary latch 3 can be pivotably accommodated around the axis 6 in the direction of the arrow P, for example in a lock plate of the motor vehicle lock 1. FIG. 1 shows the pre-latching position, whereby the pre-ratchet pawl 4 can engage with a ratchet contour 8 on the rotary latch 3.

Also shown as part of the assisted closing device 9 is a pull-handle 10, a recess 11, a traction means 12 and a Bowden cable core 13, whereby the traction means 12 and the Bowden cable core 13 can be part of a Bowden cable 12, 13. The pull-handle 10 is pivotably accommodated in the motor vehicle lock via an assisted closing path Z. The assisted closing path Z is shown as a dot-dashed line and as a circular arc in FIG. 1. Also shown is the striker 14, whereby the striker 14 has already engaged with the rotary latch 3 in the pre-latching position.

The pull-handle 10 and rotary latch 3 can respectively have a contour 15, 16 that is designed such that when the striker 14 reaches the rotary latch 3, a frictional connection, in other words for example a frictionally engaged connection, can be established between the pull-handle 10 and rotary latch 3. On the one hand, the rotary latch contour 15 and also the pull-handle contour 16 can be designed such that a frictional connection can be established in a first assisted closing path, whereas a form fit can be obtained on a second assisted closing path.

Figure 2:
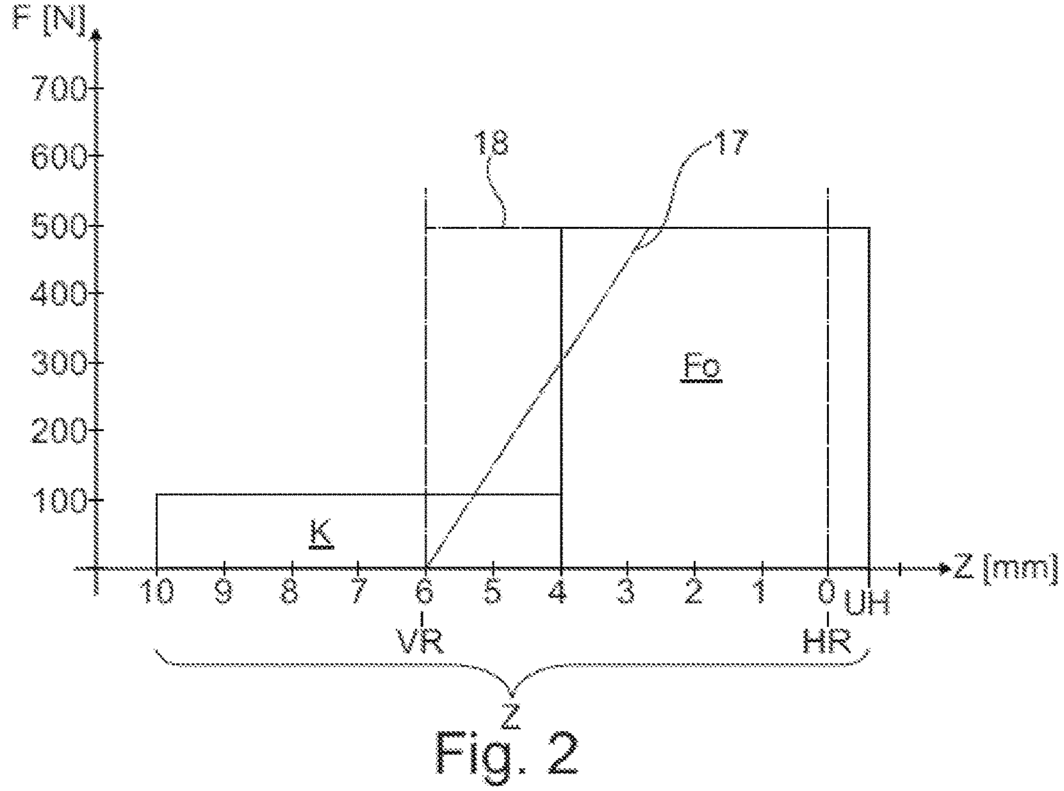
FIG. 2 is a drawing depicting a force route diagram with an illustration of a force course via a first assisted closing movement and a second assisted closing movement.
Figure 3:
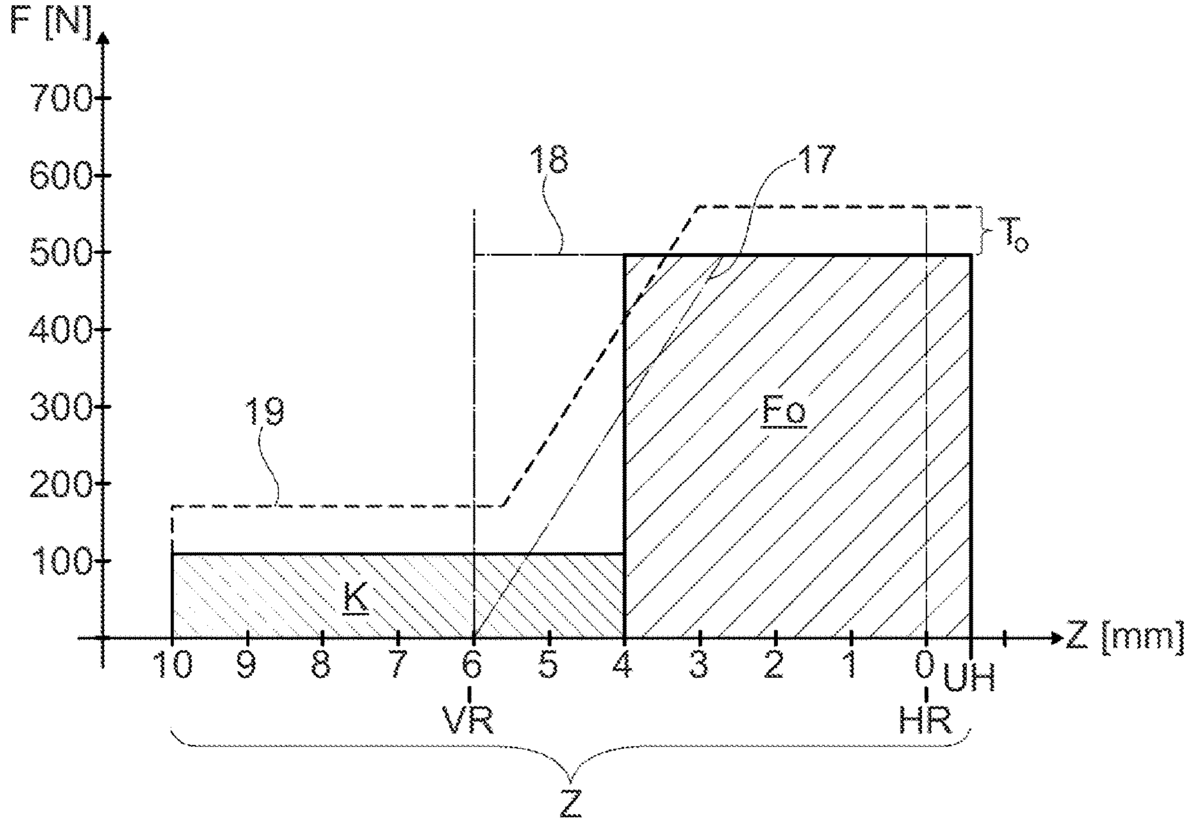
FIG. 3 is a drawing depicting a force route diagram with an illustration of a force course via a first assisted closing movement and a second assisted closing movement with a limit force line.

FIG. 2 shows a diagram whereby the assisted closing path Z is presented in millimeters above the assisted closing force in Newtons. A pre-latching position VR and a main latching position HR are indicated. In addition to this, an overstroke position ÜH is indicated again since the assisted closing device 9 moves the rotary latch in an overstroke position so that the main ratchet pawl 5 can engage in the ratchet contour 8. There is mostly a pre-latching position for a door gap of approx. 6 mm. In the main latching position, the door is closed. The overstroke position indicates the path of the rotary latch which the rotary latch takes via the main latching position, so that the pawl 5 can engage in the ratchet contour 8 of the rotary latch 3. This exemplary embodiment or the exemplary embodiment in FIG. 1 shows a locking mechanism 2 with two pawls 4, 5. It is of course also conceivable that there is only one pawl 4, 5.

The assisted closing path Z describes the path via which the pull-handle 10 moves the rotary latch 3 driven by an electric motor. According to the invention, the pull-handle 10 already engages when the rotary latch 3 engages with the striker 14. The diagram shown in FIG. 2 shows an assisted closing path Z of 10 mm plus an overstroke. The pull-handle 10 moves the rotary latch 3 in the direction of the arrow P via an assisted closing path from a door gap of 10 mm to a door gap of 4 mm. The rotary latch 3 is hereby moved with a force of 100 Newtons or moved into the closing position. The force course is shown in the diagram by K. The force course via the pre-closure from a door gap of 4 mm to the closing of the door in the main ratchet or into an overstroke ÜH is indicated by FO in the diagram.

As is clearly apparent from FIG. 2, the assisted closing movement according to the invention is not bound to the latching positions VR, HR. Rather, it is conceivable according to the invention to move the frictional connection so far in the direction of the main latching position HR that the door or flap is already mostly closed. Only when great closing forces, for example against the pressure of a door seal, are needed, does this create a form fit FO between the pull-handle 10 and the rotary latch 3, whereby the safe closure and retaining of the rotary latch is facilitated.

The force courses of the assisted closing devices known from the state of the art are also recorded on the diagram. An assisted closing movement in accordance with a progressively increasing force or a progressively increasing torque, is recorded on the diagram with the force line profile 17 and a force that is indirectly introduced with the pre-ratchet for the overstroke with the force line profile 18.

During the assisted closing, a torque is introduced into the rotary latch 3 in the direction of the arrow P by means of the pull-handle 10. The torque is hereby proportional to a power consumption and proportional to a force F that is recorded in FIG. 2 in the y-axis. If during the assisted closing, this now produces a force line profile 17, 18, which is produced via the frictional connection K and the force line profile 17 or 18, then a tolerance window TO can be specified by means of the control unit, that must not be exceeded. If the force F reaches a limit force line 19, as shown by the dashed line in FIG. 2, then there is the possibility that the control unit interrupts the assisted closing process.

If during a normal assisted closing during the frictional connection KO or the form fit FO, an excessive amount of force is applied so that the limit force line 19, thus the tolerance window TO too, is exceeded, then jamming and/or any impediment during the assisted closing can be detected by means of the control unit. As a result of the formation according to the invention and in particular as a result of the recording of the increase in current in the drive, it is hereby possible to determine a malfunction and introduce a suitable countermeasure.

The increase in current is hereby a measure for the proper procedure of the assisted closing process. A malfunction or jamming is hereby detected by means of an excessive current or an excessive force, so that the interruption, uncoupling of the assisted closing drive and/or the reversal of the assisted closing drive, can be initiated.

A sensor as the means for recording a position 20 is shown for example in FIG. 1. The sensor 20 can for example as rotary encoder, record the rotational movement of the rotary latch 3 or for example be designed as a microswitch so that the assisted closing movement Z can also be recorded. The sensor 20 is connected directly to the control unit S, whereby the control unit S in turn monitors the force absorption of the motor M. The control unit is hereby in a position, starting with the movement signal of the sensor 20, to set the power consumption of the motor M into proportion and thus to determine an excessive force or an excessive power consumption of the motor M in relation to the assisted closing process. If the force exceeds the force limit line 19 or if too high a power consumption is determined on the motor M by means of the control unit S, then the assisted closing process can be interrupted. Advantageously, in accordance with FIG. 1, the pull-handle 10 can for example be disengaged from the rotary latch 3.

LIST OF REFERENCE SIGNS

1 Motor vehicle lock
2 Locking mechanism
3 Rotary latch
4 Pre-ratchet pawl
5 Main ratchet pawl
6, 7 Axis
8 Ratchet contour
9 Assisted closing device
10 Pull-handle
11 Recess
12 Traction means
13 Bowden cable core
14 Striker
15 Rotary latch contour
16 Pull-handle contour
17, 18 Force line profile
19 Limit force line
20 Sensor
P Arrow
Z Assisted closing path
VR Pre-ratchet
HR Main ratchet
ÜH Overstroke
K Frictional connection
FO Form fit
F Force
TO Tolerance window
S Control unit
M Drive motor

The invention claimed is:

1. A lock for a motor vehicle, the lock comprising:

a locking mechanism having a rotary latch and at least one pawl, an assisted closing device comprising a pull-handle attached to a Bowden cable, an electric drive, and a torque converter, wherein the torque converter is connected to the electric drive and the Bowden cable is connected to the torque converter, wherein the torque converter is configured to exert different forces or torques into the rotary latch via the Bowden cable and the pull-handle, wherein during a first assisted closing movement of the rotary latch to a closing position in which a gap of 4 mm exists between a door or flap to be closed and a chassis of the motor vehicle, the assisted closing device transmits a first assisted closing toque into the rotary latch via a first force exerted on the Bowden cable by the torque converter and by a frictional connection between the pull-handle and the rotary latch resulting in a first constant uniform force on the rotary latch, and wherein during a second assisted closing movement of the rotary latch from the closing position to a closing of the door or flap, the assisted closing device transmits a second assisted closing torque into the rotary latch via a second force exerted on the Bowden cable by the torque converter and by a form fitting connection between the pull-handle and the rotary latch resulting in a second constant uniform force on the rotary latch.

2. The lock according to claim 1, wherein the rotary latch has a pre-latching position and a main latching position, wherein the pull-handle can engage with the rotary latch when in the pre-latching position and when in the main latching position.

3. The lock according to claim 1, wherein the assisted closing device has a pull-handle and the pull-handle can engage with the rotary latch.

4. The lock according to claim 1, wherein the assisted closing device has the Bowden cable and a transmission.

5. The lock according to claim 4, wherein the frictional connection is formed by the Bowden cable and/or by the transmission and/or by the pull-handle.

6. The lock according to claim 1, wherein the assisted closing torque in the first assisted closing movement is less than the assisted closing torque in the second assisted closing movement.

7. The lock according to claim 6, wherein in the first assisted closing movement, the assisted closing force is 100 Newtons and in the second assisted closing movement, the assisted closing force is 500 Newtons, wherein the first and second assisted closing movement is provided by the assisted closing device.

8. The lock according to claim 1 further comprising a striker, wherein an assisted closing movement of the rotary latch is transmitted into the striker through the engagement of the rotary latch.

9. The lock according to claim 1 further comprising a striker, wherein the first assisted closing movement occurs by engagement of the rotary latch into the striker to the closing position.

10. The lock according to claim 1 further comprising a sensor for recording a position of the locking mechanism, a control unit for the assisted closing device, and at least one medium for detecting a position of a mobile part of the assisted closing device, wherein the at least one medium interacts with the control unit.

11. The lock according to claim 10, wherein the at least one medium is a sensor and/or a switching device.

12. The lock according to claim 10, wherein the at least one medium for detecting the position includes a sensor that interacts with the control unit by detecting a rise in current in the electric drive, wherein the assisted closing process can be interrupted when the rise is detected.

13. The lock according to claim 12, wherein the at least one medium for detecting the position can be used to monitor a gap when closing a moved component.

14. The lock according to claim 13, wherein up to the gap being 6 mm, the interruption of the assisted closing process is controlled by the control unit.

15. The lock according to claim 13, wherein the moved component is a door, flap, cover and/or hood of the motor vehicle.

16. The lock according to claim 10, wherein the at least one medium for detecting the position is located on the rotary latch.

17. The lock according to claim 10, wherein a variable assisted closing torque is provided by the assisted closing device.

18. The lock according to claim 1, wherein the assisted closing device interacts directly with the locking mechanism or a retaining band.

19. The lock according to claim 18, wherein the rotary latch can be moved by the assisted closing device.

20. The lock according to claim 1, wherein the torque converter comprises a sliding clutch connected to the electric drive, wherein the Bowden cable and the sliding clutch are in a semi-engaged connection.

* * * * *